United States Patent

Kushibiki et al.

[11] Patent Number: 5,905,108
[45] Date of Patent: May 18, 1999

[54] OPTICAL SILICA-CONTAINING POLYSILOXANE RESIN

[75] Inventors: Nobuo Kushibiki; Kikuko Takeuchi, both of Kanagawa, Japan

[73] Assignee: Dow Corning Asia, Ltd., Tokyo, Japan

[21] Appl. No.: 09/040,915

[22] Filed: Mar. 18, 1998

[30] Foreign Application Priority Data

Mar. 19, 1997 [JP] Japan .................................. 9-066848

[51] Int. Cl.$^6$ ....................................................... C08K 3/00
[52] U.S. Cl. ............................................. 524/492; 524/493
[58] Field of Search ....................................... 524/492, 493

[56] References Cited

U.S. PATENT DOCUMENTS 3,986,997 10/1976 Clark .................................. 260/29.2 M
5,371,155 12/1994 Kobayashi ............................... 525/477

FOREIGN PATENT DOCUMENTS 55-48245 of 1990 Japan .
7-294701 of 1995 Japan .

OTHER PUBLICATIONS

Chapter 12–15 of "Silicone Handbook" by Kunio Itoh (Nikkan Kogyo Shinbunsha, 1990).

Chapter 3 of "Modern Silicone Technolgy" (CMC, 1986) by Makoto Kumata and Masashi Wada.

*Primary Examiner*—Edward J. Cain
*Attorney, Agent, or Firm*—Sharon K. Severance

[57] ABSTRACT

An optical silica-containing polysiloxane resin comprises colloidal silica and a polysiloxane resin. The polysiloxane resin has the formula $RSiO_{3/2}$, where R is selected from the group consisting of hydrocarbon groups of 1 to 4 carbon atoms and fluorohydrocarbon groups of 3 to 10 carbon atoms. The fluorohydrocarbon groups have the general formula $C_nF_{(2n+1)}C_2H_4$—, where n is an integer of 1 to 8. The optical silica-containing polysiloxane resin has high light transmissivity and high surface hardness, and can be used for optical elements.

18 Claims, No Drawings

001,108

OPTICAL SILICA-CONTAINING POLYSILOXANE RESIN

FIELD OF THE INVENTION

This invention relates to a polysiloxane-based optical resin with a high light transmissivity for use in optoelectronic elements.

BACKGROUND OF THE INVENTION

The superior optical characteristics of polysiloxane-based silicon resins have attracted considerable attention in the field of optical and optoelectronic elements. The rubber elasticity of polydimethylsiloxane is essential for use in intraocular lenses, varifocal optical elements, and the like, where flexibility is required in addition to optical properties. Also, investigations have been conducted into using polysiloxanes in the manufacture of wave guides. Moldable polysiloxane-based composite optical materials made up of finely divided silica and polysiloxane resin are disclosed in JP-A-07-294701. These materials represent a type of polysiloxane resin that can be used for ordinary optical elements that require rigidity along with optical characteristics. One of the characteristics of polysiloxanes is their relatively low index of refraction as compared with hydrocarbon resins.

One advantage of a low index of refraction is the suppression of reflection at interfaces when light passes through such materials. High polymers having fluorine atoms in the molecule are known in the art to have a low index of refraction. Compared with ethylene-propylene copolymers, the index of tetrafluoroethylene-hexafluoropropylene copolymers is as low as approximately 0.1. Polysiloxanes obtained by bonding fluorohydrocarbon radicals in polysiloxane resins, and thus containing fluorohydrocarbon radicals, to improve the water repellency and oil repellency of polysiloxane resins have been disclosed in JP-A-55-48245 (1980) and U.S. Pat. No. 5,371,155 issued to Kobayashi on Dec. 6, 1994. However, such resins were developed without paying attention to their optical characteristics, and there have been various problems concerning their application in optical elements.

Transparent materials with a low index of refraction are applied as the outermost coating layer in optical elements to provide a reflection-preventing film. Magnesium fluoride, $MgF_2$, has been widely used as a coating material for forming such reflection-preventing films. However, its use requires films to be formed on the surface of optical elements by means of sputtering, and uniform coating of large surfaces of organic materials has posed serious difficulties in terms of techniques and equipment.

Improving resin strength by adding micro particles of finely divided silica to polysiloxane resin is a technique known in the art. However, in many cases, this technique gives optically opaque compositions. For example, in JP-A-07-294701 (1995), the resins disclosed are optically opaque when fluorohydrocarbon radicals are introduced.

One object of this invention is to provide an optical polysiloxane resin suitable for optical elements. A further object of this invention is to provide an optical polysiloxane resin exhibiting a superior light transmissivity and a high surface hardness based on the use of a polysiloxane resin, having radicals selected from the group consisting of hydrocarbon radicals, fluorohydrocarbon radicals, and combinations thereof.

SUMMARY OF THE INVENTION

This invention relates to an optical silica-containing polysiloxane resin comprising colloidal silica and a polysiloxane resin. The polysiloxane resin has silicon bonded radicals selected from the group consisting of hydrocarbon radicals of 1 to 4 carbon atoms, fluorohydrocarbon radicals of 3 to 10 carbon atoms, and combinations thereof. The fluorohydrocarbon radicals have the general formula $C_nF_{(2n+1)}C_2H_4$—, where n is an integer of 1 to 8. The amount of colloidal silica is not more than 200 parts by weight, per 100 parts by weight of the polysiloxane resin. The spectral transmission factor of the optical silica-containing polysiloxane resin in the range of 250 nm to 800 nm is not less than 80%, and the index of refraction is not more than 1.43.

DETAILED DESCRIPTION OF THE INVENTION

This invention relates to an optical silica-containing polysiloxane resin comprising a polysiloxane resin and colloidal silica. Preferably, the polysiloxane resin has the general formula $RSiO_{3/2}$, wherein each R is a radical selected from the group consisting of hydrocarbon radicals of 1 to 4 carbon atoms and fluorohydrocarbon radicals of 3 to 10 carbon atoms. The fluorohydrocarbon radicals have the general formula $C_nF_{(2n+1)}C_2H_4$—, where n is an integer with a value of 1 to 8.

Suitable hydrocarbon radicals for R include methyl, ethyl, butyl, and propyl radicals. Methyl is preferred. The fluorohydrocarbon radicals have in their structure perfluorocarbon radicals bonded to silicon atoms via ethylene radicals. Perfluoromethyl, perfluoroethyl, perfluoropropyl, perfluorobutyl, perfluoroamyl, perfluorohexyl, perfluoroheptyl, and perfluoroctyl are examples of such perfluorocarbon radicals.

Colloidal silica is essential for enhancing and maintaining surface hardness and other mechanical characteristics of the optical polysiloxane resin composition. However, addition of colloidal silica to polysiloxane resins tends to contribute to increasing their index of refraction.

Colloidal silicas suitable for enhancing optical transparency have a particle diameter of, preferably, 10 to 40 nm. When the particle diameter becomes too small, secondary coagulation is liable to occur. When particle diameter is too large, this contributes to light scattering.

The amount of colloidal silica is 1 to 200 parts by weight, per 100 parts by weight of the polysiloxane resin. When the amount of colloidal silica is less than 1 part by weight, mechanical strength is insufficient. When the amount exceeds 200 parts by weight, the cured polysiloxane resin composition becomes brittle, and this is undesirable from the standpoint of refraction index. Preferably, the amount of colloidal silica is 10 to 200 parts by weight, more preferably 20 to 100 parts by weight.

"Colloidal silica" means ordinary colloidal silicas and silicas obtained by additional treatment of colloidal silicas. For example, "colloidal silica" includes silica gels.

To achieve a uniform dispersion of colloidal silica in solvents by suppressing the formation of secondary particles, the surface of the colloidal silica is preferably subjected to an appropriate treatment, as long as the treatment does not create problems in the manufacture of the polysiloxane resin.

"Transmissivity" refers to spectral transmittance. It is measured by using commercially available visible UV spectrophotometers, without carrying out the index matching operation during measurement.

It is known in the art that the index of refraction of polysiloxane resins can be regulated by varying the type and number of the radicals. Index of refraction can be changed by changing the type of fluorohydrocarbon radicals, the type of hydrocarbon radicals, and the ratio between the two. Furthermore, adding small amounts of vinyl and other alkenyl radicals, and SiH radicals, to enhance curing functionality is acceptable as long as it does not seriously affect the index of refraction.

If the silicon-bonded radicals have a high number of carbon atoms, the index of refraction increases, the surface hardness of the film decreases, and it tends to become more flexible. Incidentally, although the pencil hardness of polysiloxanes that contain 5% of fluorohydrocarbons with a chain length n of 8 in addition to methyl radicals is 5H, when about 20% of fluorohydrocarbon radicals with an n of 4 are admixed thereto in addition to methyl radicals, the pencil hardness becomes 5H.

For example, when nonafluorohexyl radicals ($C_4F_9C_2H_4$—) are substituted for 1 mol % of the silicon bonded alkyl radicals in the polysiloxane resin, the sodium d-line refraction index becomes as low as 0.0024.

"Index of refraction" refers to the index of refraction based on the d-line of sodium at 587.6 nm. The index of refraction of the optical silica-containing polysiloxane resin is not more than 1.43. The advantage of a low index of refraction is low reflection at the interface with air. In optical equipment that uses lasers, such as optical disks and the like, errors are generated because of a decrease in the luminous energy of the input and output light due to reflection at the interface. Formation of interference waves in the recording phase leads to generation of noise.

The optical silica-containing polysiloxane resin composition of the present invention makes it possible to lower the index of refraction to 1.38 or lower by using the following methods:

(1) Use only methyl radicals as the silicon-bonded substitution radicals in the polysiloxane resin and reducing the amount of colloidal silica added.

(2) Regulate the amount of colloidal silica and the proportion of methyl radicals and fluorohydrocarbon radicals.

Preferably, in the resin of the formula $RSiO_{3/2}$, wherein each R is selected from the group consisting of hydrocarbon radicals and fluorohydrocarbon radicals of the formula $C_nF_{(2n+1)}C_2H_4$, n is 1 to not more than 6, the fluorohydrocarbon radicals constitute not more than 70% of all R groups, and the pencil hardness of the optical silica-containing polysiloxane resin is not less than 6H.

More preferably, the hydrocarbon radicals for R are methyl radicals; the fluorohydrocarbon radicals have n=4; and the amount of colloidal silica in the optical silica-containing polysiloxane resin is not less than 30 to not more than 100 parts by weight, per 100 parts by weight of the polysiloxane resin. In this case, the optical silica-containing polysiloxane resin has an index of refraction less than or equal to 1.38 and a pencil hardness of less than or equal to 6H.

The polysiloxane resin can be prepared by the following process: finely divided silica and an organosilicon compound with hydrolyzable radicals are mixed in a solvent and subjected to hydrolysis and condensation polymerization through dehydration. Suitable processes are described in Chapters 12~15 of "Silicone Handbook" by Kunio Itoh (Nikkan Kogyo Shinbunsha, 1990) or Chapter 3 of "Modern Silicone Technology" (CMC, 1986) by Makoto Kumata and Masashi Wada.

Because the resin of the present invention is optically transparent, it is preferable to disperse the colloidal silica in a solvent and react the organosilicon compound having hydrolyzable radicals therewith. When the reaction is conducted as above, the silanol radicals remaining in the colloidal silica and the hydrolyzed organic silane react with each other. This forms a silica-containing polysiloxane resin, in which colloidal silica is evenly dispersed. In addition, catalysts can be added to accelerate the hydrolysis. Examples of suitable catalysts include formic acid, acetic acid, propionic acid, oxalic acid, malonic acid, glutaric acid, glycolic acid, tartaric acid, and esters thereof.

Hydroxyl radicals and hydrolyzable radicals may remain in the polysiloxane resin bonded to silicon atoms. When the amount of hydroxyl radicals and hydrolyzable radicals is too high, the storage stability of the polysiloxane resin tends to decrease. When the amount is too small, sufficient crosslinking does not take place. Preferably, the amount of these radicals bonded to silicon atoms in the polysiloxane resin is 0.1 to 4 wt %. The amount can be adjusted to the desired range using methods known in the art. For example, alkoxysilanes and such can be added after or during synthesis of the polysiloxane. When crosslinking the polysiloxane with an adjusted amount of such hydrolyzable radicals, crosslinking can be carried out by adding crosslinking agents. Suitable crosslinking agents include silicon compounds with siloxane bonds and multiple hydrolyzable radicals or hydroxyl radicals in each molecule. Suitably hydrolyzable radicals include methoxy, ethoxy, propoxy, acetoxy, butoxy, and methylethylketoxime.

Although catalysts are not necessary for crosslinking the polysiloxane resins, catalysts can be used. Suitable catalysts are selected taking into account curing time, curing temperature, and such. Suitable catalysts are selected from the group consisting of dibutyltin diacetate, dibutyltin dilaurate, dibutyltin octylate, and other alkyltin salts of organic acids, butyl titanate and other esters of titanic acid, or organic acids, primarily acetic acid, and the like.

When the polysiloxane resin has alkenyl radicals, a different curing method can be used. Curing can be carried out by mixing the polysiloxane and a crosslinking agent that is a polysiloxane or silicon compound having multiple SiH radicals in the molecule. A platinum family catalyst, such as catalysts known in the art for addition-type silicone rubber curing reactions or hydrosilylation reactions, is added.

Leveling agents may be used as additives, as long as this does not create obstacles in terms of curing in the present invention. Suitable leveling agents include polyester-modified silicones, and the like.

This invention provides an optically transparent optical silica-containing polysiloxane resin with a low index of refraction and a high surface hardness. When applied to the surface of optical recording media, the optical silica-containing polysiloxane resin can prevent reflection by the surface of the recording media, thereby preventing frictional damage, soiling, moisture absorption, and other effects. The optically transparent optical silica-containing polysiloxane resin can also be applied to optical elements composed of inorganic materials or organic materials to obtain similar effects.

EXAMPLES

These examples are intended to illustrate the invention to those skilled in the art and should not be interpreted as limiting the scope of the invention set forth in the claims.

"Water-base dispersion S of colloidal silica" and "isopropyl alcohol dispersion T of colloidal silica" are defined in Table 1. In the examples below, "water-base dispersion S of colloidal silica" is designated as "S" and "isopropyl alcohol dispersion T of colloidal silica" is designated as "T."

The method used for measuring the index of refraction was based on preparing thin films by coating silicon substrates with a polysilxane solution and then using a Gardner™ L115B rotary analyzer technique.

Example 1

32.05 g of isopropyl alcohol dispersion T of colloidal silica was placed in a flask and 28.6 ml of water, 25.60 g of methyltriethoxysilane, 5.87 g of 3,3,4,4,5,5,6,6,6-nonafluorohexyltrimethoxysilane, and 6.29 g of acetic acid were added thereto under agitation. The mixture was heated to 65~70° C., and the reaction was conducted for 6 hours. The product was diluted with 10.65 g of isopropyl alcohol, and 2.4 g dibutyltin dilaurate was gradually added thereto.

The solution was used for spin coating a quartz substrate at 300 rpm for 10 seconds and then at 3,000 rpm for 60 seconds. It was dried at a temperature of 120° C. for 2 hours, to obtain a thin film of optical silica-containing polysiloxane resin.

This thin film was subjected to spectral transmittance measurements in the region of 250~800 nm using a spectrophotometer, model U-3210 from Hitachi. Its outside appearance was examined, its pencil hardness was measured and its index of refraction was measured under the conditions in Table 3. The results are in Table 6.

Example 2

32.07 g of isopropyl alcohol dispersion T of colloidal silica was placed in a flask and 5.99 ml of water, 32.13 g of methyltriethoxysilane, 2.83 g of n-perfluoroctylethyltriethoxysilane, and 6.29 g of acetic acid were added thereto under agitation. The mixture was heated to 65~70° C. and the reaction was conducted for 2 hours. The product was diluted with 1.58 g of isopropyl alcohol, and 2.4 g dibutyltin dilaurate was gradually added thereto.

The solution was used for spin coating a quartz substrate in the same manner as in Example 1. It was dried at a temperature of 120° C. for 2 hours, obtaining a thin film of optical silica-containing polysiloxane resin.

The outside appearance of the thin film was examined, and its spectral transmittance, index of refraction and pencil hardness were measured as in Example 1. The results are in Table 6.

Examples 3 and 4

Using the raw materials in Table 4, coating films of silica-containing polysiloxane resin were produced and results measured as in Example 1. The results are in Table 6.

Examples 5 to 13

The silica-containing polysiloxanes obtained using the raw materials indicated in Table 4 were used for spin coating silicon substrates under the conditions indicated in Table 2. Thin films were produced by drying at 110° C. The outside appearance of the films was examined, and their spectral transmittance, index of refraction and pencil hardness were measured as in Example 1. The results are in Table 6.

TABLE 1

Definitions

| | Manufacturer | Product Name | Particle Diameter (nm) | Content of $SiO_2$ (wt %) |
|---|---|---|---|---|
| Water-based dispersion S of colloidal silica | Nissan Chemical Industries, Ltd. | Snowtex 40 | 10~20 | 40 |
| Isopropyl alcohol dispersion T of colloidal silica | Nissan Chemical Industries, Ltd. | IPA-ST | 10~20 | 30 |

TABLE 2

Spin Coating Conditions

| Example | RPM | Time (sec) | RPM | Time (sec) |
|---|---|---|---|---|
| 1, 2, 3, 4 | 300 | 10 | 3,000 | 60 |
| 5, 8, 9 | 300 | 10 | 3,500 | 60 |
| 6, 7, 10, 11, 12, 13 | 300 | 10 | 4,000 | 60 |

TABLE 3

Measurement of Index of Refraction

| Equipment | Gardner ™ L115B |
|---|---|
| Measurement Method | Rotary Analyzer Technique |
| Optical Source | He—Ne laser (632.8 nm) |
| Angle of Incidence | 70° |
| Data Sampling Time | 8 sec |
| Detector | Photodiode |
| Sample Storage Conditions | Room Temperature, in atmosphere |

TABLE 4

Raw Materials Used to Prepare the Coatings

| Expl | Type of Fluorohydro-carbon Radical (X) | $XSiO_{3/2}:MeSiO_{3/2}$ mol: mol | Type of colloidal silica |
|---|---|---|---|
| 1 | $C_4F_9C_2H_4$- | 10:90 | T |
| 2 | $C_8F_{17}C_2H_4$- | 2.5:97.5 | T |
| 3 | None | 0:100 | T |
| 4 | $C_4F_9C_2H_4$- | 60:40 | T |
| 5 | None | 0:100 | T:S = 1:1 |
| 6 | None | 0:100 | S |
| 7 | None | 0:100 | T:S = 1:1 |
| 8 | None | 0:100 | T:S = 1:1 |
| 9 | None | 0:100 | T:S = 1:1 |
| 10 | $C_4F_9C_2H_4$- | 30:70 | T |
| 11 | $C_8F_{17}C_2H_4$- | 7:93 | T |
| 12 | $CF_3C_2H_4$- | 50:50 | T |
| 13 | $CF_3C_2H_4$- | 70:30 | T |

TABLE 5

Composition of the Optical Silica-Containing Polysiloxane

| Example | Polysiloxane Resin (parts by weight) | Colloidal Silica (parts by weight) |
|---|---|---|
| 1 | 100 | 67 |
| 2 | 100 | 67 |
| 3 | 100 | 25 |
| 4 | 100 | 60 |
| 5 | 100 | 67 |
| 6 | 100 | 25 |

TABLE 5-continued

Composition of the Optical Silica-Containing Polysiloxane

| Example | Polysiloxane Resin (parts by weight) | Colloidal Silica (parts by weight) |
|---------|--------------------------------------|------------------------------------|
| 7       | 100                                  | 43                                 |
| 8       | 100                                  | 100                                |
| 9       | 100                                  | 150                                |
| 10      | 100                                  | 67                                 |
| 11      | 100                                  | 67                                 |
| 12      | 100                                  | 100                                |
| 13      | 100                                  | 100                                |

TABLE 6

Results

| Example | Pencil Hardness | Index of Refraction | Spectral Transmissivity (%) | Outside Appearance |
|---------|-----------------|---------------------|-----------------------------|--------------------|
| 1       | 7H              | 1.393               | Not less than 96            | Transparent        |
| 2       | 7H              | 1.408               | Not less than 96            | Transparent        |
| 3       | 6H              | 1.368               | Not less than 95            | Transparent        |
| 4       | 7H              | 1.375               | Not less than 95            | Transparent        |
| 5       | 9H              | 1.401               | Not less than 95            | Transparent        |
| 6       | 9H              | 1.385               | Not less than 95            | Transparent        |
| 7       | 9H              | 1.405               | Not less than 95            | Transparent        |
| 8       | 9H or more      | 1.417               | Not less than 95            | Transparent        |
| 9       | 9H or more      | 1.426               | Not less than 95            | Transparent        |
| 10      | 7H              | 1.39                | Not less than 95            | Transparent        |
| 11      | 9H              | 1.419               | Not less than 95            | Transparent        |
| 12      | 9H              | 1.407               | Not less than 95            | Transparent        |
| 13      | 9H              | 1.406               | Not less than 95            | Transparent        |

We claim:

1. An optical silica-containing polysiloxane resin comprising:
    a) a polysiloxane resin having a formula $RSiO_{3/2}$, wherein R is selected from the group consisting of hydrocarbon radicals of 1 to 4 carbon atoms, fluorohydrocarbon radicals, and combinations thereof, wherein the fluorohydrocarbon radicals have a structure $C_nF_{(2n+1)}C_2H_4$— and 3 to 10 carbon atoms, and wherein n is an integer with a value of 1 to 8; and
    b) 1 to 200 parts by weight of colloidal silica, per 100 parts by weight of the polysiloxane resin; and
    wherein the optical silica-containing polysiloxane resin has a spectral transmission factor of not less than 80% in the range of 250 to 800 nm and an index of refraction of not more than 1.43.

2. The optical silica-containing polysiloxane resin of claim 1, wherein n is 1 to not more than 6, and the fluorohydrocarbon radicals comprise not more than 70% of all R radicals.

3. The optical silica-containing polysiloxane resin of claim 1, wherein 10 to 60 mol % of the polysiloxane resin contains fluorohydrocarbon groups for R having n=4.

4. The optical silica-containing polysiloxane resin of claim 1, wherein 50 to 70 mol % of the polysiloxane resin contains fluorohydrocarbon groups for R having n=3.

5. The optical silica-containing polysiloxane resin of claim 1, wherein 2.5 to 7 mol % of the polysiloxane resin contains fluorohydrocarbon groups for R having n=8.

6. The optical silica-containing polysiloxane resin of claim 1, wherein the hydrocarbon radicals for R are selected from the group consisting of methyl, ethyl, butyl, and propyl radicals.

7. The optical silica-containing polysiloxane resin of claim 1, wherein the amount of colloidal silica is in the range of not less than 10 parts by weight and not more than 200 parts by weight, per 100 parts by weight of the polysiloxane resin.

8. The optical silica-containing polysiloxane resin of claim 7, wherein the amount of colloidal silica is 20 to 100 parts by weight.

9. The optical silica-containing polysiloxane resin of claim 1; wherein the amount of colloidal silica is not less than 30 to not more than 100 parts by weight, per 100 parts by weight of the polysiloxane resin; the hydrocarbon radicals for R are methyl radicals; and the fluorohydrocarbon radicals for R have n=4.

10. The optical silica-containing polysiloxane resin of claim 1, wherein the colloidal silica has a particle diameter of 10 to 40 nm.

11. The optical silica-containing polysiloxane resin of claim 1, wherein the colloidal silica is a silica gel.

12. The optical silica-containing polysiloxane resin of claim 1, wherein the polysiloxane resin contains 0.1 to 4 weight % of hydroxyl and hydrolyzable radicals.

13. The optical silica-containing polysiloxane resin of claim 12, wherein the hydrolyzable radicals are selected from the group consisting of methoxy, ethoxy, propoxy, acetoxy, butoxy, and methylketoxime.

14. The optical silica-containing polysiloxane resin of claim 1, wherein a catalyst for crosslinking the polysiloxane resin is added.

15. The optical silica-containing polysiloxane resin of claim 14, wherein the catalyst is selected from the group consisting of alkyltin salts of organic acids, esters of titanic acid, and organic acids.

16. The optical silica-containing polysiloxane resin of claim 1, wherein the polysiloxane resin has alkenyl radicals, and the polysiloxane resin is cured by mixing the polysiloxane resin, a platinum family catalyst, and a crosslinking agent selected from the group consisting of polysiloxanes and silicon compounds having multiple SiH radicals per molecule.

17. The optical silica-containing polysiloxane resin of claim 1, further comprising a leveling agent.

18. The optical silica-containing polysiloxane resin of claim 15, wherein the leveling agent is a polyester-modified silicone.

* * * * *